(No Model.)
J. B. RHODES.
SAW TOOTH SWAGING DEVICE.
No. 402,770. Patented May 7, 1889.
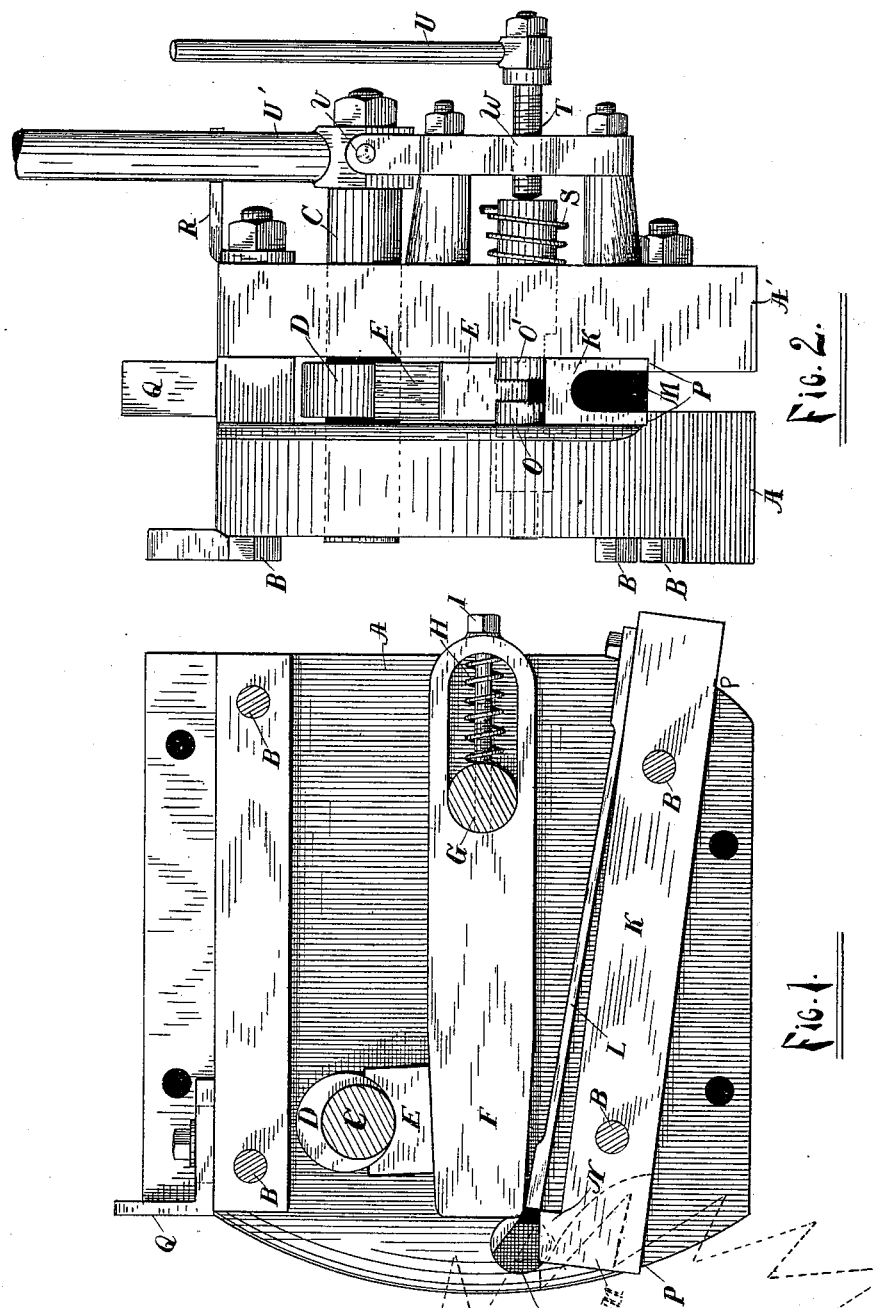
Witnesses,
Harry P. Van Wagner
Hugh E. Wilson
Inventor,
James B. Rhodes
By his Attorney
Edward Taggart

UNITED STATES PATENT OFFICE.

JAMES B. RHODES, OF GRAND RAPIDS, MICHIGAN.

SAW-TOOTH-SWAGING DEVICE.

SPECIFICATION forming part of Letters Patent No. 402,770, dated May 7, 1889.

Application filed August 22, 1888. Serial No. 283,485. (No model.)

*To all whom it may concern:*

Be it known that I, JAMES B. RHODES, a citizen of the United States, residing at the city of Grand Rapids, in the county of Kent and State of Michigan, have invented certain new and useful Improvements in Saw-Tooth Swages, of which the following is a specification.

My invention relates to a saw-swaging machine for swaging the teeth of saws of all kinds; and it relates particularly to certain improvements patented to me by Letters Patent numbered 282,325, and dated May 8, 1888.

The objects of my invention are, first, to simplify the construction of the machine; second, to support the anvil in a secure and immovable position; third, to adapt the swage to use in swaging both circular and straight saws, and, fourth, to insure accuracy in its operations. These objects I accomplish by means of the mechanism illustrated in the accompanying drawings, in which—

Figure 1 is a front elevation of my machine with its cap removed, and Fig. 2 is an end elevation of the complete invention.

Similar letters refer to similar parts throughout the entire drawings.

The body of the machine I prefer to make of cast-iron, and it is composed of the bed-plate A and the cap A', securely attached together by means of bolts B B B B. The bed-plate is preferably provided with bolt-holes for attaching the machine to some suitable support for use; but these bolt-holes may be dispensed with. I provide the bed-plate with a rib, which may be cast integral with the bed-plate, the object of the rib being to support the cap at one side while the other side of the cap rests upon the anvil.

K is the anvil, which is supported upon the shoulders P P, each shoulder supporting one side of the anvil the entire length of the bed-plate and cap. The position of the anvil as it rests upon the shoulders P P is shown clearly in Fig. 2.

N is the flat portion of the anvil, which receives the lower side of the saw-tooth for swaging. Beneath the flat surface N the anvil is grooved or cut away, as shown by M. The groove M is of sufficient depth and size to allow room for the tooth on the saw below the tooth which is undergoing the operation of swaging.

The dotted lines in Fig. 1 show the position of a circular saw placed in my machine for swaging.

L is a spring-stop for adjusting the saw to the proper position upon the anvil. This spring-stop L is preferably bolted to the anvil K at the end opposite the end having the groove M, and it serves not only as a tooth-stop, but also to raise the upper die to its normal position after it has been brought downward by the eccentric.

F is the upper die, turning on the bolt G and having an inclined or beveled front, and between which and the flat surface N the saw-tooth is swaged into the proper shape.

H is a spring designed to hold the die F in contact with the bolt G.

I is a screw-bolt designed to adjust the die longitudinally. In certain cases both the spring H and the screw-bolt I may be dispensed with.

C is a shaft extending through the bed-plate A and cap A', and provided with an eccentric, D, rigidly attached thereto, and also with a lever, U', by means of which the shaft is oscillated.

E is an intermediate block between the eccentric and the die F. The lever U', when raised, rests against a stop, R, which retains the lever in an upright position.

V is a stop, which checks the downward movement of the lever U'. The saw is clasped between jaws O and O'. The jaw O is stationary and set into the bed-plate in the manner shown in Fig. 2. The jaw O' fits the cap A' in such a manner that it may be moved longitudinally.

T is a screw-bolt having a thread which engages with a screw-thread in the nut W. The screw-bolt is operated by means of a lever, U.

The saw-tooth to be set is placed between the jaws O and O'. The jaw O' is closed upon the tooth by means of the lever U and screw-bolt T. The lower straight side of the saw-tooth thus clamped rests upon the smooth face of the anvil. The die F is now brought down by means of the lever U', shaft C, and eccentric D, flattening and forming the front of the tooth to the required shape. By lifting the lever U' the die F is relieved from the pressure, and is lifted to its normal position by the spring L. The lever U is now turned back, releasing the jaw O' from pressure, when the spring S carries it back to the position for receiving another saw-tooth.

The spring L and the anvil K need no adjustment. In all cases the point of the saw-tooth to be operated upon is in contact with the end of the said spring L.

The die F may be adjusted longitudinally by means of the screw-bolt I. In using my device upon straight saws the saw is clamped in the manner above described, the tooth-point touching the end of the spring L, and the saw above coming in contact with the guide Q. I prefer to make the faces of the clamping-jaws grooved, serrated, or roughened, in order to insure a firm grasp upon the saw. All parts of the machine should be strongly built, in order to insure efficient work.

Having thus described my invention, what I claim to have invented, and desire to secure by Letters Patent, is—

1. In a saw-tooth swage, the combination, with the stationary anvil and the movable upper die, of a spring fastened to the anvil and located between the said anvil and upper die, said spring adapted to stop the saw-tooth and to return the upper die to its normal position when pressure is removed therefrom, substantially as described.

2. In a saw-tooth swage, the combination, with the bed-plate and cap, each provided with a longitudinal shoulder, P, and the upper die secured between said bed-plate and cap, of the anvil adapted to rest on said shoulders between the bed-plate and cap and secured therein by bolts, substantially as described.

3. In a saw-tooth swage, the combination, with the bed-plate and cap, of an anvil secured between the two, said anvil having a flat top face for receiving the saw-tooth, and an inclined groove beneath the flat surface, the upper die, and a spring between the anvil and the upper die adapted to stop the saw-tooth and to raise the upper die to its normal position when pressure is removed therefrom, substantially as described.

In witness whereof I have hereunto set my hand and seal in the presence of two witnesses.

JAMES B. RHODES. [L. S.]

Witnesses:
EDWARD TAGGART,
C. OSCAR PORTER.